Jan. 16, 1968  J. P. MALEC  3,363,644

FLUID CHECK VALVE

Filed Nov. 4, 1963

INVENTOR.
JERRY P. MALEC
BY
Dick & Zarley
ATTORNEYS

United States Patent Office 3,363,644
Patented Jan. 16, 1968

3,363,644
FLUID CHECK VALVE
Jerry P. Malec, 2578 Harney St.,
Omaha, Nebr. 68131
Filed Nov. 4, 1963, Ser. No. 321,186
7 Claims. (Cl. 137—516.15)

This invention relates to fluid check valves and more particularly to a check valve having no metallic moving parts.

Most check valves have a metallic spring loaded metallic valve head. Such metallic check valves have many disadvantages. Due to the various moving parts rapid wear is experienced. Also the manufacture and assembly of metallic check valves are relatively expensive. Furthermore, the wearing metal parts may contaminate an entire system. Perhaps the chief objection to metal check valves is their tendency to permit bubble type leakage due to their metal to metal construction.

Some effort has been made to use a resilient O-ring as the movable part of the valve. In such check valves the O-ring rests in a groove that is V-shaped in cross-section. The objection to this structure is that when the flexible resilient O-ring experiences back pressures the O-ring is distorted into the V-shaped groove. As the back pressure increases the O-ring is obviously forced deeper and deeper into the V-groove. Thus incoming plus-pressure must overcome this wedging effect and the distortion of the O-ring. This makes for a slow acting valve, and a valve of poor sensitivity. Furthermore, the O-ring experiences excessive wear.

Therefore one of the principal objects of my invention is to provide a check valve that has no metallic moving parts.

A further object of this invention is to provide a check valve that has only one non-metallic moving part.

A still further object of this invention is to provide a check valve of the "O-ring" type that provides efficient rapid positive sealing, without adverse distortion of the O-ring when the O-ring is experiencing back pressures.

A still further object of this invention is to provide a check valve of the "O-ring" type that permits back pressure to affect only the top of the O-ring above the inlet port in the bottom of the groove.

A still further object of this invention is to provide a check valve that permits maximum fluid flow in one direction.

Still further objects of my invention are to provide a check valve that is economical in manufacture and durable in use.

These and other objects will be apparent to those skilled in the art.

This invention consists in the construction, arrangements, and combination, of the various parts of the device, whereby the objects contemplated are attained as hereinafter more fully set forth, specifically pointed out in the claims, and illustrated in the accompanying drawings, in which:

Figure 1:
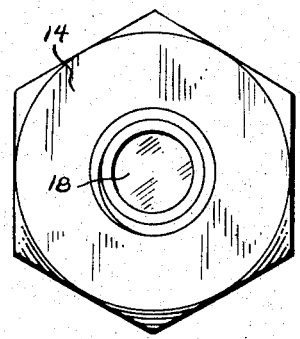
FIG. 1 is a rear end view of my check valve.
Figure 2:
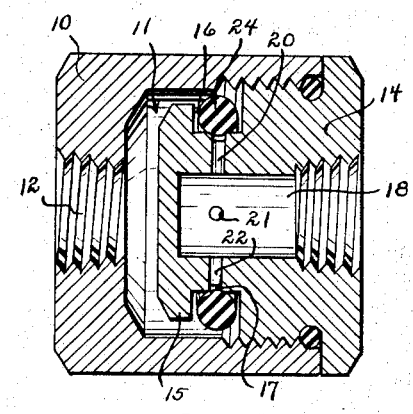
FIG. 2 is a longitudinal sectional view of the check valve.
Figure 3:
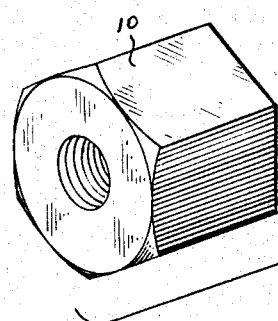
FIG. 3 is an exploded perspective view of the parts of my check valve.
Figure 3:
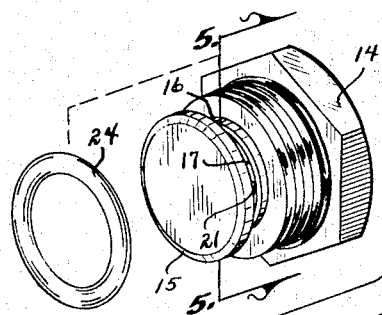
Figure 5:
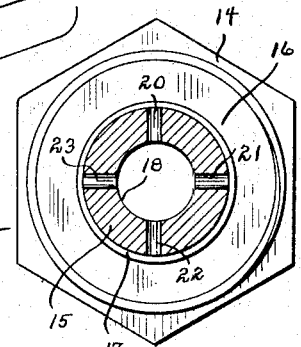
FIG. 5 is a cross-sectional view of my check valve taken on line 5 of FIG. 3 and more fully illustrates its construction.
Figure 4:
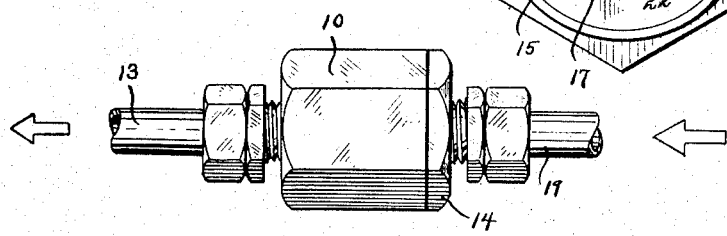
FIG. 4 is a reduced side view of the check valve installed in a fluid conduit.

In these drawings I have used the numeral 10 to generally designate the female cup portion of my check valve. The fixture element 10 has an inside cylindrical cavity area 11. The numeral 12 designates a centrally located threaded hole in the bottom of the fixture 10 and into which is detachably threaded the outlet conduit pipe 13 as shown in FIG. 4. The numeral 14 generally designates the male plug portion or supporting member of the check valve. This plug fixture element is detachably threaded into the open end of the cup portion 10 as shown in FIG. 2. When this plug portion is completely threaded into the cup portion, the open end of the cup portion will be sealed. The length of the plug portion is such that its forward end will terminate a substantial distance from the inside bottom of the cup portion in order to maintain an open space in the bottom area of the cup portion. Also the forward end portion 15 of the plug 14 is reduced in diameter relative to the inside diameter of the cup portion to provide an open space around the forward end portion of the plug and which communicates with the inside bottom of the cup portion. Cut into and completely around the portion 15 is a groove 16, rectangular in cross-section. Cut into the center bottom of the continuous groove 16 is a continuous relative small ring groove 17 as shown in FIG. 5. The numeral 18 designates a forwardly extending well in the plug portion 14. Detachably threaded into the rear end area of this well is the inlet conduit pipe 19. In the forward end area of the plug portion 14 and radially extending from and communicating with the well 18 are four evenly spaced apart passageways 20, 21, 22, and 23. Each of these passageways has its outer end communicating with the bottom of the small groove 17. In the continuous groove 16 is a flexible resilient O-ring 24 of rubber-like material. This O-ring 24 has its inner side yieldingly engaging and sealing the top of the small groove 17. The width of the O-ring is greater than that of the width of the groove 17, but its width is substantially less than that of the width of the groove 16. By this arrangement and relative size of parts, fluid under pressure may easily enter the well 18 of the check valve through the pipe 19, pass therefrom through the passageways 20, 21, 22 and 23 into the small groove 17, expand and raise the O-ring 24, pass radially outwardly in the groove 16 around both sides of the O-ring, to the top of the O-ring, thence into the inside bottom area of the cup portion 10, thence through the hole 12, and into the exit pipe conduit 13. However, if there develops a back pressure in the pipe 13, or if the pressure therein exceeds the pressure in the pipe 19, the fluid will re-enter the area 11 of the check valve through the hole 12. The fluid cannot move farther rearwardly because of the O-ring 16 closing the top of the small groove 17 and therefore operatively closing the passageways 20, 21, 22 and 23. This sealing and closing action of the O-ring is due not only to the flexible resilient character of the O-ring. This action is made possible by the width of the groove 16 being greater than that of the width of strand of the O-ring. Also the diameter of each of the passageways 20, 21, 22 and 23 is substantially that of the width of the small groove 17 and, therefore, each passageway has a diameter substantially less than that of the width strand of the O-ring. The exact opposite action takes place when the fluid pressure in the well 18 is higher than the fluid pressure in the pipe 13. Under these circumstances the relative small diameter passageways 20, 21, 22 and 23, with the greater fluid pressure, will easily expand and lift the O-ring from the small groove 17 and permit fluid to flow through the check valve. The entire function of the check valve is accomplished successfully by only one moving part, i.e. the O-ring. The O-ring is non-metallic. Its movement requires no metallic actuating spring and is of substantially silent operation. Replacement of the O-ring when needed is easy. From the above it will be appreciated that there is no V-shaped groove into which the O-ring can be forced and distorted by back pressures. A back pressure (checked pressure) affects only the area of the O-ring directly over the incoming pressure inlet means.

Some changes may be made in the construction and arrangement of my fluid check valve without departing from the real spirit and purpose of my invention, and it is my intention to cover by my claims, any modified forms of structure or use of mechanical equivalents which may be reasonably included within their scope.

I claim:
1. In a check valve,
 a housing having an inlet opening and an outlet opening,
 an internal supporting member in said housing having a cavity in communication with the inlet opening of said housing,
 a forward end portion on said supporting member in communication with the outlet opening of said housing,
 a continuous circular groove in and around said forward end portion;
 said groove being rectangular in cross-section and having a base and opposite side walls,
 at least one passageway in said supporting member having one end communicating with the cavity of said supporting member and its other end operatively communicating with the bottom of said groove and a flexible resilient O-ring in said groove in diametrically yieldable sealing contact with the base of said groove and being spaced from said opposite side walls and having a strand width substantially less than that of the width of said groove,
 said O-ring and said groove being centered over said other end of said passageway, and said O-ring gripping the bottom of said groove sufficiently to resist any lateral movement within said groove, and
 a second continuous circular groove having an inner edge and an outer edge being in the center bottom of said first groove, said second groove having a width substantially less than that of said first groove, and said other end of said passageway being in communication with said inner edge of said second groove.

2. The structure of claim 1 wherein said O-ring yieldably engages said outer edge of said second groove to prevent communication between said first groove and said second groove at times.

3. The structure of claim 1 wherein said O-ring has a strand width substantially greater than the width of said groove.

4. The structure of claim 1 wherein the width of said second groove is substantially equal to the width of said passageway.

5. In a check valve,
 a cup portion adapted to have its inside bottom in communication with an outlet conduit,
 a plug portion detachably threaded into said cup portion having a cavity adapted to be in communication with an inlet conduit,
 said plug portion having a forward end portion of an outside diameter less than that of the inside diameter of said cup portion and terminating a substantial distance from the inside bottom of said cup portion,
 a continuous circular groove in and around said forward end portion and rectangular in cross-section and having a base and opposite side walls,
 a plurality of passageways in said plug portion each having one of its ends communicating with the cavity of said plug portion and its other end operatively communicating with the center bottom of said groove,
 and a flexible resilient O-ring in said groove in diametrically yieldable sealing contact with the base of said groove and being spaced from said opposite side walls and having a strand width substantially less than that of the width of said groove,
 said O-ring being centered over said other ends of said passageways and gripping the bottom of said groove sufficiently to resist any lateral movement within said groove, and
 a second continuous circular groove being in the center bottom of said first groove and connecting all of said passageways, each of said other ends of said passageways being in communication with the inner edge of said second groove.

6. The structure of claim 5 wherein said second groove is rectangular in cross-section and has a width substantially less than the width of said first groove.

7. The structure of claim 5 wherein said second groove has a width substantially less than the strand width of said O-ring.

References Cited

UNITED STATES PATENTS

| | | | |
|---|---|---|---|
| 3,191,626 | 6/1965 | Leibfritz | 137—625.69 |
| 1,366,151 | 1/1921 | Astrom | 137—525 |
| 2,095,842 | 10/1937 | Steenstrup | 137—512.15 |
| 2,614,793 | 10/1952 | Storm | 137—525 |

WILLIAM F. O'DEA, *Primary Examiner.*

D. R. MATTHEWS, *Assistant Examiner.*